United States Patent
McBride

(10) Patent No.: US 6,349,365 B1
(45) Date of Patent: Feb. 19, 2002

(54) USER-PRIORITIZED CACHE REPLACEMENT

(75) Inventor: Andrew McBride, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/415,892

(22) Filed: Oct. 8, 1999

(51) Int. Cl.[7] ............................................. G06F 12/00
(52) U.S. Cl. .................................................... 711/133
(58) Field of Search ............................... 711/133, 134, 711/136

(56) References Cited

U.S. PATENT DOCUMENTS

| | | | | |
|---|---|---|---|---|
| 5,887,152 A | * | 3/1999 | Tran | 395/393 |
| 6,023,747 A | * | 2/2000 | Dodson | 711/141 |
| 6,101,595 A | * | 8/2000 | Pickett et al. | 712/205 |

OTHER PUBLICATIONS

McFarling, "Cache Replacement with Dynamic Exclusion," WRL Technical Note TN–22, Nov. 1991, pp. 1–22.

* cited by examiner

*Primary Examiner*—Kevin L. Ellis
*Assistant Examiner*—C. P. Chace
(74) *Attorney, Agent, or Firm*—Conley, Rose & Tayon, PC; B. Noël Kivlin

(57) ABSTRACT

A method and apparatus for encoding cache replacement priority information is disclosed. A computer software program may be used to allow programmers to specify which portions of source or object code being generated should be treated as high priority with respect to cache line replacement. The cache line replacement information may be encoded as special prefix bits/bytes, special opcodes, or as a separate data file. The software program may also be configured to autonomously determine which portions of the object code being generated should be identified as high priority with respect to cache line replacement. The program may also allow the programmer to specify certain points in the code after which instructions that had previously been identified as high priority should be reclassified as low priority. Opcodes or prefix bytes clearing previously stored cache replacement information may also be encoded in the object code. A microprocessor and computer system configured to execute code with embedded cache line replacement information are also disclosed.

27 Claims, 10 Drawing Sheets

USER-PRIORITIZED CACHE REPLACEMENT

BACKGROUND OF THE INVENTION

1. Field of the Invention

This invention relates to microprocessors and more particularly, to cache replacement schemes within microprocessor caches.

2. Description of the Relevant Art

Superscalar microprocessors are capable of attaining performance characteristics which surpass those of conventional scalar processors by allowing the concurrent execution of multiple instructions. As a result of executing multiple instructions per clock cycle, a superscalar processor's performance is heavily impacted by the processor's ability to quickly move instructions from memory to the execution units within the processor that actually execute the instructions. Since main system memory is typically designed for density rather than speed, microprocessor designers have added caches to their designs to reduce the microprocessor's need to directly access main memory. A cache is a small memory that is more quickly accessible than the main memory. Computer systems may have a number of different levels of caches. For example, a computer system may have a "level one" cache that is internal to the microprocessor (i.e., on-chip), and a "level two" cache that is external to the microprocessor. Caches are typically constructed of fast memory cells such as static random access memories (SRAMs) which have faster access times and bandwidth than the memories used for the main system memory (typically dynamic random access memories (DRAMs) or synchronous dynamic random access memories (SDRAMs)). The faster SRAMs are not typically used for main system memory because of their lower density and corresponding higher cost. Other types of caching are also possible. For example, the main system memory may act as a cache for the system's slower direct access storage devices (e.g., hard disk drives).

When microprocessors need data from memory, they typically first check their level one cache to see the if the required data has been cached. If not, the data is requested from memory. If the second level cache is storing the data, it provided the data to the microprocessor (typically at much higher rate than the main system memory is capable of). If the data is not cached in the first or second level caches (referred to as a "cache miss"), the data is read from main system memory or some type of mass storage device (e.g., a hard disk drive). Relative to accessing the data from the level one cache, accesses to memory take many more clock cycles.

Caches typically operate on the principal of locality of reference, which states that the data most recently used (and the data in that locality) is more likely to be accessed than the rest of the data in general. This principle holds because computer software tends to be somewhat linear in execution and typically has loops and branches that cause previously executed code to be re-executed. By storing recently accessed instructions and data in a cache, system performance may be increased because the microprocessor need not wait for the instructions and data to read from main memory.

Microprocessor and computer system architects have taken this principle one step further by using techniques such as branch prediction to proactively store instructions and data in the cache before they are actually needed by the microprocessor. In addition, when an instruction or byte of data is read from memory, additional bytes following the instruction or data are read and cached. Once again, the principal of locality of reference dictates that these instruction and data bytes are more likely to be needed by the processor than the other data or instructions at large.

Since cache size is limited by a number of factors (including die size, power consumption, and cost), care must be taken when loading information into the cache. Once particular area of concern for the designer is when to overwrite or invalidate existing instructions and data in a cache to make room for new instructions and data. A common solution is to track the frequency of accesses and then replace the least recently used instructions or data with new instructions or data. Other solutions include random replacement, and first-in first-out techniques. While these techniques are all effective to a certain extent, none of them are able to take advantage of the underlying structure of the program being executed.

Given the heavy penalty associated with cache misses, a more accurate method for determining which instructions and data should be cached and which instructions and data should be overwritten is needed.

SUMMARY OF THE INVENTION

The problems outlined above may at least in part be solved by a method and apparatus that allows programmers to prioritize instructions and/or data with respect to caching and cache replacement. Advantageously, this may improve performance by reducing cache misses. Furthermore, encoding cache replacement information may also caches of a particular size to be utilized more efficiently, thereby freeing precious die space for other purposes (e.g., more functional/execution units). Depending upon the exact implementation, the method may be applied to both instruction and data caches.

A microprocessor configured to utilize cache priority information is contemplated. In one embodiment, the microprocessor comprises a cache, a predecode unit, and a cache controller. The cache may comprise a plurality of storage locations (referred to as cache lines), each storing a predetermined number of instruction and/or data bytes. The predecode unit is configured to receive/predecode instructions bytes and detect the presence of cache replacement priority prefix bytes or opcodes. This information may then be routed to the cache's control logic (i.e., the cache controller). The cache controller may then store this information along with other predecode information and the actual instruction bytes in the cache. The cache control logic is configured to utilize the stored cache replacement priority information to determine which instruction bytes stored in the cache should be overwritten. Note, as used herein the term "overwritten" may mean flushed, invalidated, or written back to memory, depending upon the type of cache being used. In addition to a microprocessor, a computer system capable of executing code that contains cache replacement information is also contemplated.

Note, as used herein, a "high priority instruction" is an instruction that will likely receive preferable treatment during the cache line replacement process. When a cache is full and new data is read from memory, the cache's control logic must determine where to store the new information (i.e., which of the old cache lines to overwrite). The present invention allows cache replacement priority (CRP) data regarding which bytes in the cache should or should not be overwritten to be stored. For example, if a programmer knows that a particular subroutine will be called repeatedly through a program, then the programmer may indicated to the compiler that the instructions forming the subroutine should be marked as high priority instructions. The compiler may do this in a number of different ways, depending upon the implementation. In one embodiment, special prefix bytes are added to the high priority code. These prefix bytes may be detected by the prefetch/predecode unit of the microprocessor executing the program. The prefetch/predecode unit may then signal the microprocessor's cache that the instructions should be given preferential treatment during the cache line replacement process (i.e., instructions marked low priority or those not marked high priority should be overwritten before the high priority instructions are overwritten).

In some embodiments, the compiler may also allow the programmer to indicate one or more points in the program after which the high priority instructions shall be converted to normal or low priority instructions. For example, in a computer graphics program, there may be one portion of the program that is high priority at the beginning of execution, e.g., a subroutine that processes a user's keyboard input. This routine may be repeated a number of times. However, once the user selects a particular function (e.g., rendering a three-dimensional image), the programmer may want to make all of the microprocessor's resources available to the rendering routine. Thus the programmer may indicate that once the rendering subroutine is invoked, the subroutine that processes the user's keyboard input should be reclassified as normal or low priority (with the rendering subroutine subsequently being classified as high priority). indicate that once the rendering subroutine is invoked, the subroutine that processes the user's keyboard input should be reclassified as normal or low priority (with the rendering subroutine subsequently being classified as high priority).

A computer software program embodied on a computer readable medium (e.g., diskette, CD-ROM, RAM, or ROM) and configured to compile source code into object code that includes cache replacement priority information is also contemplated. In some embodiments, the compiler may be configured to translate source code instructions into object code instructions, determine which source code instructions are high priority for caching, and encode cache priority information into the object code. The cache priority information may be encoded as special prefix bytes, special opcode bytes, or as a separate data file. In some embodiments the computer program may be configured to receive input from the user indicating which portions of the source or object code are high priority. The computer program may also be configured to receive input from the user indicating at which points of the source or object code instructions designated as high priority should be reclassified as normal or low priority.

In some embodiments, the computer software program may be configured to operate somewhat autonomously, by (i) tracking the execution of the object code, (ii) identifying portions of the object code that are repeated the greatest number of times, and (iii) embedding cache replacement priority information in the object.

BRIEF DESCRIPTION OF THE DRAWINGS

Other objects and advantages of the invention will become apparent upon reading the following detailed description and upon reference to the accompanying drawings in which.

Figure 1:
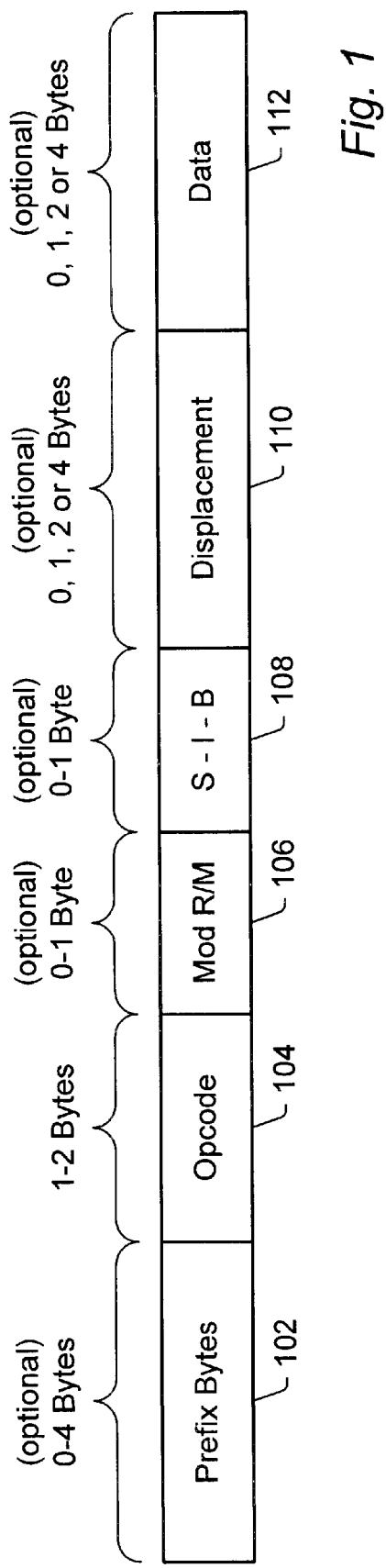
FIG. 1 is a block diagram of a generic x86 instruction format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a diagram of one embodiment of the x86 instruction format is shown. As the figure illustrates, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more of the optional prefix bytes 102. For example, one of prefix bytes 102 may be used to change the address or operand size for an instruction, to override the default segment used in memory addressing, or to instruct the processor to repeat a string operation a number of times. The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes. While the examples shown herein refer to the x86 instruction format, the present invention may also be implemented with other instruction sets (e.g., instructions sets for the following types microprocessors: PowerPC™, PA-RISC, MIPS, Alpha, and other RISC or VLIW microprocessors). The present invention may also be implemented for instruction sets executable in digital signal processors (DSPs) and microcontrollers.

As noted above, in some embodiments the cache replacement priority ("CRP") information may be encoded as special opcodes 104 embedded within the executing object code. In other embodiments, the CRP information may be encoded as special prefix bytes 102 within the executing object code. Similarly, information indicative of when to clear the stored CRP information may also be encoded as special opcodes and/or as special prefix bytes within the executing object code. If the particular instruction set being used does not provide for prefix bytes 102, then the functionality described herein may be implemented using only special opcodes 104. Yet another alternative is encode the CRP information as a data file associated with the executing object code. This is explained in greater detail further below.

Figure 2:
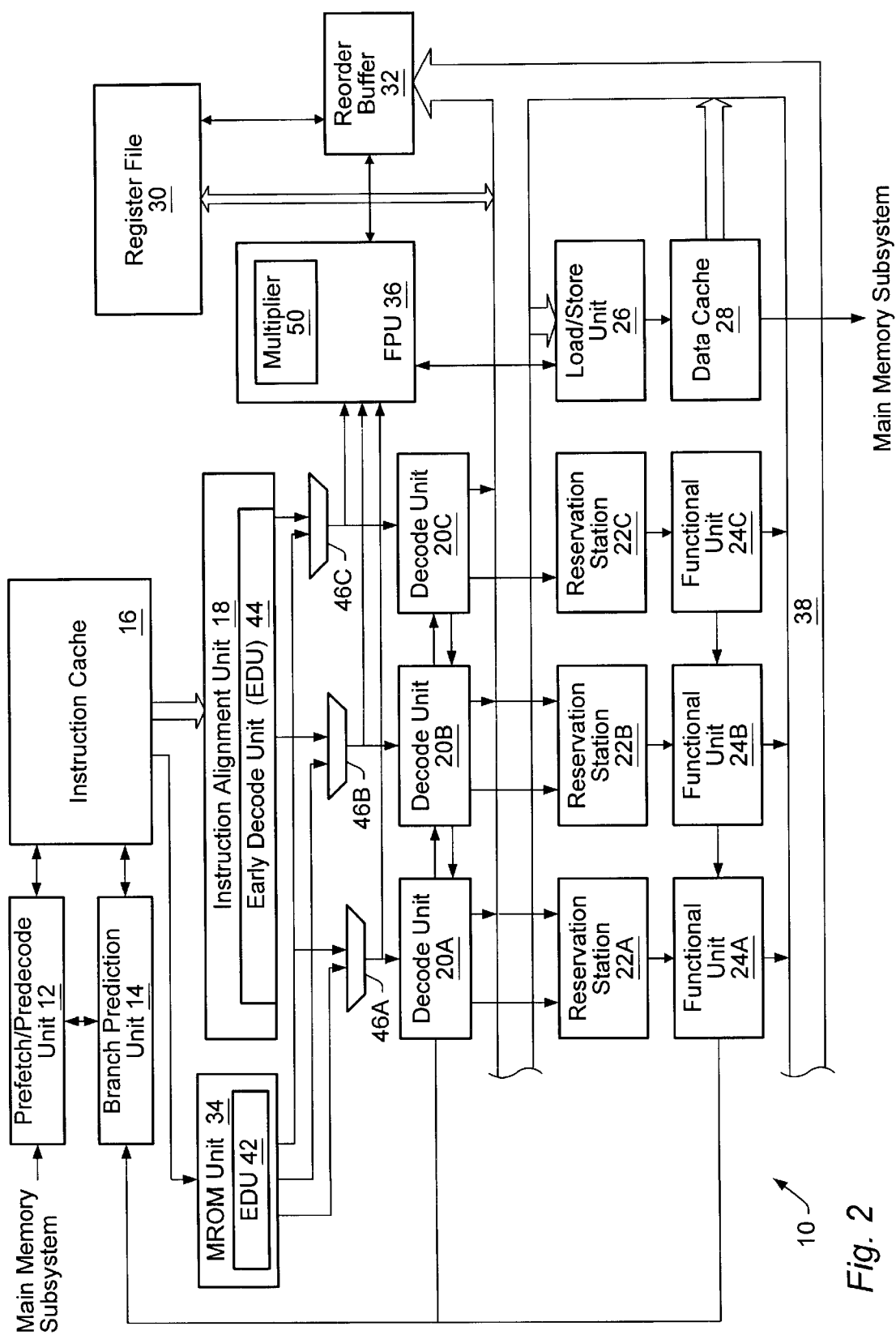
FIG. 2 is a block diagram of a one embodiment of a microprocessor.

Turning now to FIG. 2, a block diagram of one embodiment of a microprocessor 10 configured to detect and utilize CRP information is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2-way set-associativity may be employed as well as any other desired associativity. Instruction cache 16 may additionally employ a way prediction scheme in order to speed access times to the instruction cache 16. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 may, for example, generate the following predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. As will be described in greater detail below, prefetch/predecode unit 12 may also be configured to detect prefix and/or opcode bytes indicated of CRP information.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Before proceeding with a detailed description of the valid mask generator used within instruction cache 16, general aspects regarding other subsystems employed within the exemplary superscalar microprocessor 10 of FIG. 2 will be described.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, fins issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Prefetch/Predecode Unit and Instruction Cache Interface

Figure 3:
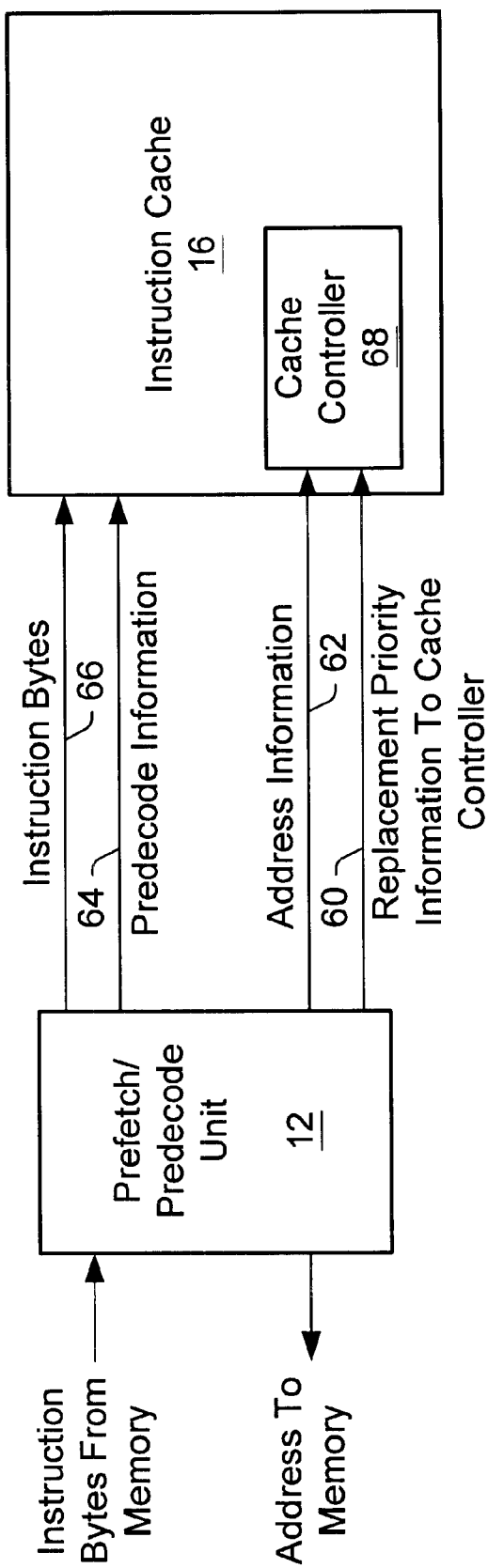
FIG. 3 is a block diagram of one embodiment of the prefetch/predecode unit and instruction cache from FIG. 2.

Turning now to FIG. 3, one embodiment of prefetch/predecode unit 12 and instruction cache 16 are shown. In this embodiment, prefetch/predecode unit 12 is configured to communicate with instruction cache 16 via a number of different buses 60–66. Upon receiving instruction bytes from memory, predecode unit 12 performs its predecoding function by generating predecode bits as described above. Address information corresponding to the instruction bytes (e.g., the prefetch address) is provided to instruction cache 16 via address information bus 62. The address information is used by instruction cache controller 68 to determine where to store the instruction bytes (received on instruction byte bus 66) and the corresponding predecode bits (received on predecode information bus 64). Note, that the figure merely describes one possible embodiment and that other configurations are possible and contemplated. For example, a single bus could be used to convey the instruction bytes and predecode information.

As part of its predecoding functions, predecode unit 12 may detect instructions with prefix bytes that are indicative of particular priority levels for cache replacement. As described in the background section, many instruction sets (including the popular x86 instruction set) have prefix bytes that provide information about the corresponding instruction. In one embodiment, an extra set of prefix bytes may be defined to indicate the cache priority of the corresponding instruction. These prefix bytes may be part of every instruction, or they may be optional and thus may included as needed for only the high priority instructions. Prefetch/predecode unit 12 may be configured to detect these prefix bytes and decode this information for instruction cache controller 68. Cache controller 68 may then incorporate this priority information into its cache line replacement scheme. For example, if cache controller 68 is configured to use a least recently used (LRU) scheme, then cache controller may store the priority information for each cache line along with the access history for each cache line. To utilize this information, cache controller 68 may perform its traditional LRU scheme, but ignore high priority cache lines.

As noted above, certain instruction opcodes and/or prefix bytes may be used to set instruction priority with respect to cache line replacement. In one embodiment, one prefix may be used to mark instructions that have a high priority with respect to cache line replacement. Any cache lines having one or more of these high priority cache lines may be given preferential treatment when determining which cache lines to keep and which ones to invalidate. A special clearing opcode may also be defined to clear the priority information for the instruction cache. Thus, the cache controller may be configured to follow its standard cache replacement algorithm, but refrain from replacing any cache lines having high priority instructions. Depending upon the exact implementation, once the predecode unit, a decode unit, or an execution unit detects the clearing opcode, this information may be conveyed to the cache controller. The cache controller may in turn be configured to clear the priority information for all cache lines. This embodiment may also be implemented with a cache controller utilizing other replacement schemes, e.g., a random replacement scheme or a first-in first-out replacement scheme.

In another, more elaborate embodiment, a number of different prefix bytes may be defined (e.g., class A, class B, class C, and class D). The clearing opcode may be accompanied by data indicative of which class of CRP information should be cleared by the cache controller. For example, assuming the program being executed had two high priority loops, the instructions in one loop could be designated with a priority A, and the instructions in the other loop could be designated with a priority B. Then, at a point in the code where the first loop will no longer be accessed, the clear opcode may be inserted by the programmer (or compiler) followed by a data byte indicating that the priority A instructions may now be replaced in the cache.

In some embodiments, in addition to invalidating the priority information, the clear opcode may be used by the cache controller to specifically indicate with cache lines should be the next to be invalidated. For example, using the embodiment described above, once the clear opcode followed by the priority A data byte is detected, the cache controller may be configured to invalidate the cache lines having priority A instructions before all other cache lines.

In yet another embodiment, the prefix byte may indicate the number of times the cache line will be accessed before the cache controller may invalidate the cache line. This may be particularly useful when the programmer has a loop of code that the programmer knows will be accessed a certain number of times.

Load/Store Unit and Data Cache Interface

Figure 4:
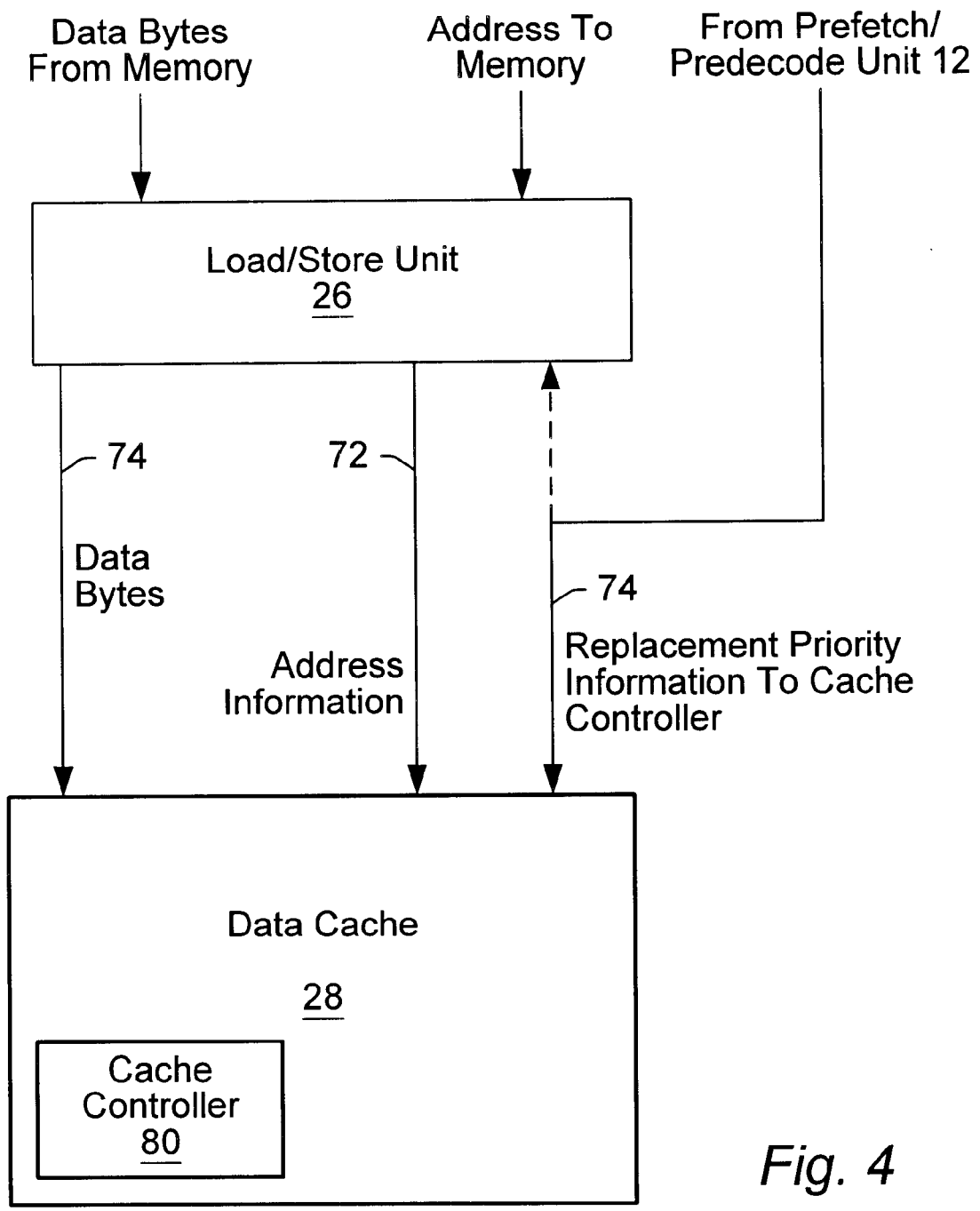
FIG. 4 is a block diagram showing one embodiment of the load/store unit and data cache from FIG. 2.

Turning now to FIG. 4, details of load/store unit 26 and data cache 28 are shown. Load/store unit 26 receives data and addresses from memory and from decode units 20 corresponding to load and store instructions. As with instruction cache 16, prefetch/predecode unit 12 may be configured to route cache replacement priority (CRP) information to load/store unit 26 or directly to cache controller 80 (within data cache 28). In one embodiment, CRP information relating to load and store instructions is encoded as one or more prefix bytes added to the corresponding load and/or store instruction. As previously described, these prefix bytes are detected by prefetch/predecode unit 12 and routed to load/store unit 26 and/or data cache 28 on replacement priority information bus 74. In another embodiment, the CRP prefix bytes are simply routed to load/store unit 26 along with the instruction's opcode. In this embodiment, load/store unit 26 decodes the prefix byte and conveys the corresponding CRP information to cache controller 80 within data cache 28. The CRP information may be passed to data cache 28 along with corresponding data bytes (on bus 74) and address information (on bus 72). As with the previously described embodiment shown in FIG. 3, special CRP clear opcodes may be encoded within the object code to provide cache controller 80 and/or load/store unit 26 with information indicative of when to clear the corresponding CRP information. As also previously described, clear and CRP priority information may be encoded solely using prefix bytes, solely using opcodes, or using a combination of both prefix bytes and opcodes.

Details of One Embodiment of a Cache

Figure 5:
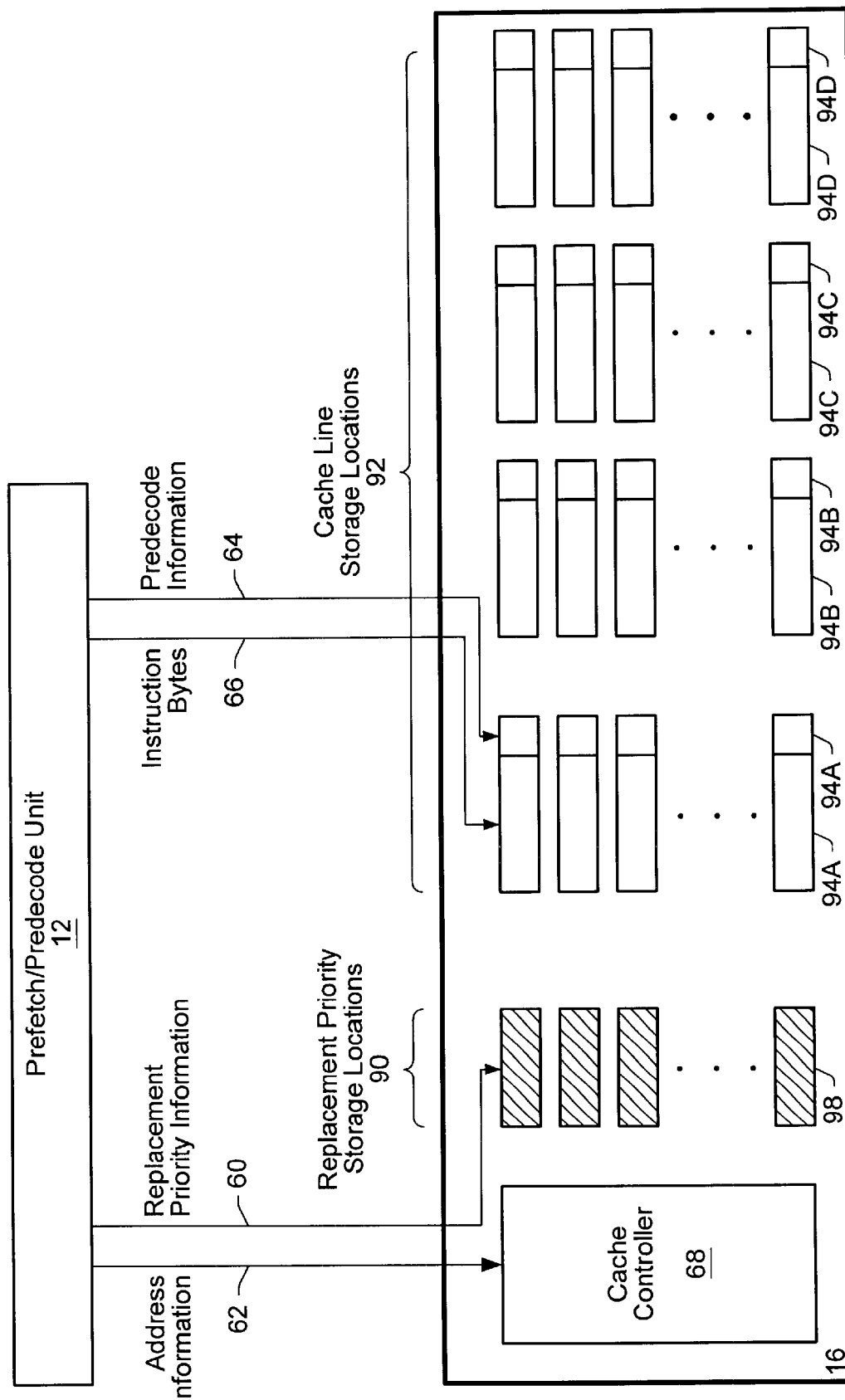
FIG. 5 is a block diagram illustrating more details one embodiment of an instruction cache.

Turning now to FIG. 5, details of one embodiment of instruction cache 16 are shown. As shown in the figure, prefetch/predecode unit 12 is configured to communicate with instruction cache 16 using a plurality of buses (62–66). Cache controller 68 is configured to receive address information from prefetch/predecode unit 12 on address bus 62. Cache controller 68 is configured to use the address information to select the cache storage line within which to store the corresponding instruction bytes (received on bus 66) and predecode information (received on bus 64). Instruction cache 16 may be configured using a number of different techniques, including direct mapped, set associative, or fully-associative. The embodiment shown in the figure is a four-way set associative configuration that comprises one replacement priority storage location for each row or "set" of four cache lines. For example, replacement priority storage location 98 stores CRP information for cache line storage locations 94A–94D. As also shown in the figure, each cache line storage location has a corresponding predecode information storage location (96A–96D). In this embodiment, cache controller 68 determines which row will be overwritten based on the contents of replacement priority storage locations 90. While this embodiment provides less resolution for the CRP information, it may also simplify cache controller logic 68.

Upon receiving new instruction bytes, cache controller 68 is configured to store the instruction bytes and corresponding predecode information in one of cache lines storage locations 92. The corresponding replacement priority information is stored in the corresponding location in replacement priority storage 90. In some embodiments, cache controller 68 may implement a technique similar to that used in graphics applications for Z-buffering. Assuming there are different levels of priority, cache controller 68 will only overwrite the contents of the replacement priority storage location if the priority of the newly-stored instruction bytes are higher than the priority of the instructions in the other cache lines within that particular row. Thus, cache controller 68 only stores one priority categorization for each row of cache line storage locations 92 (i.e., the highest priority of a single instruction in the row). Other algorithms for prioritization are also possible and contemplated. For example, controller 68 may alternatively store only the lowest priority categorization for each particular row.

Figure 6:
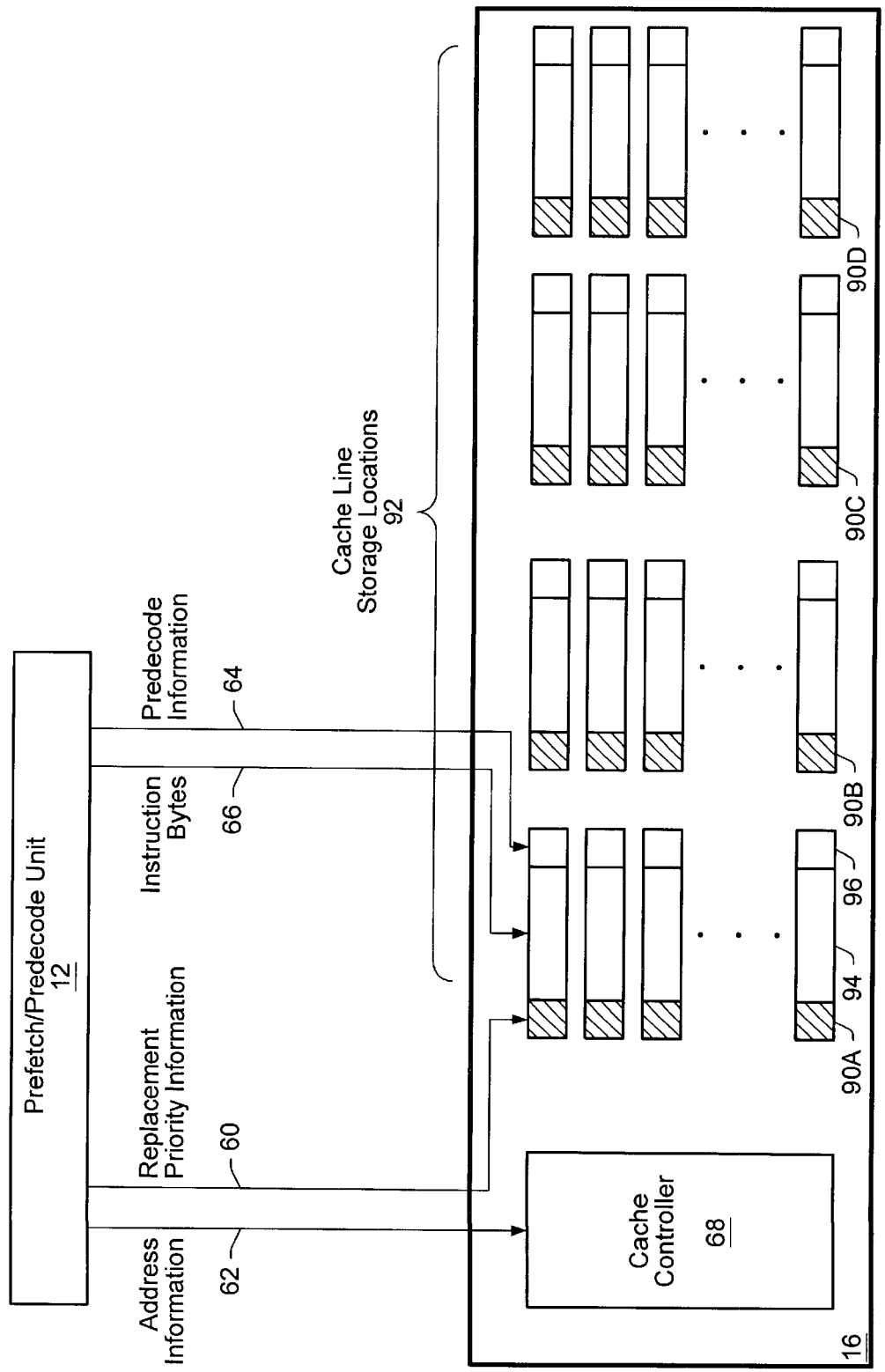
FIG. 6 is a block diagram illustrating more details of another embodiment of an instruction cache.

Turning now to FIG. 6, another embodiment of instruction cache 16 is shown. In this embodiment, each cache line within instruction cache 16 comprises a instruction byte field 94, a predecode information field 96, and a priority information field 90 (see for example priority information fields 90A–D in the final row of cache storage locations 92). This embodiment of cache 16 may function in a similar manner to that previously described, but the CRP information may be stored for each individual cache line instead of each row of cache lines. Either prefetch/predecode unit 12 or cache controller 68 may be configured to detect the highest priority instruction in a particular cache line and then store that instruction's priority information in the corresponding priority information field 90. For example, assuming a cache line has four instructions and only one of the four instructions is a high priority instruction, cache controller 68 may be configured to store a high priority indicator in the priority information field 90 corresponding to the cache line. In this way, cache controller 68 may effectively perform a Boolean OR function with the priority information for each instruction within a cache line (assuming the priority information is Boolean, i.e., high priority or not high priority). In other embodiments with greater than two levels of priority, cache controller 68 may be configured to find the maximum priority present and store that priority for the entire cache line. Once again, other methods are possible and contemplated.

Method for Utilizing CRP Information

Figure 7:
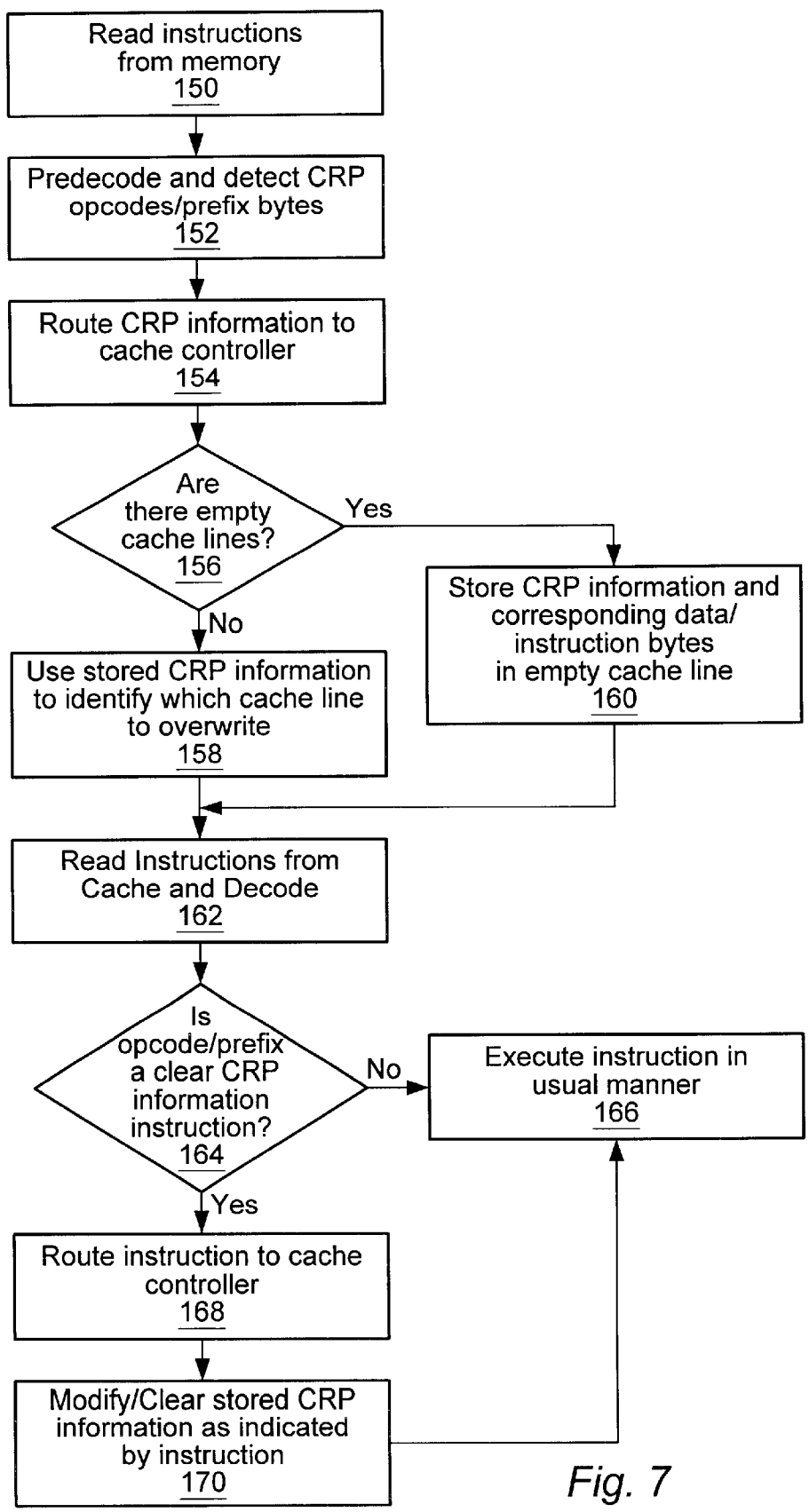
FIG. 7 is a flowchart illustrating one embodiment of a method for storing and using cache replacement priority (CRP) information.

Turning now to FIG. 7, one embodiment for a method for utilizing encoded CRP data is shown. In this embodiment, instructions are first read from memory (step 150). Next, the instructions are predecoded, and any CRP opcodes and/or any CRP prefix bytes are detected (step 152). The CRP information, if any, is then routed to the cache control logic (step 154). The predecoded instructions and any corresponding predecode information may also be routed to the cache at this time. The cache controller is configured to determine whether there are any empty cache lines available (step 156). If there are empty cache lines available (that meet the cache's addressing scheme), then cache controller is configured to select one and store the instructions, predecode information, and corresponding CRP information in that cache line (step 160). If there are no empty cache lines (i.e., empty cache lines capable of storing the instruction bytes within the cache's address scheme), then the cache controller is configured to use the stored CRP information to identify which cache line should be overwritten (step 158). Alternatively, in some embodiments if the contents of the current cache line consists solely of low priority instructions (e.g., those instructions known to be unlikely candidates for being executed again), then the cache controller may forgo storing the corresponding cache line in the instruction cache at all.

Next, the predecoded instructions and corresponding predecode information are read from the instruction cache and decoded (step 162). During decoding, the microprocessor's decode units may be configured to detect whether a particular instruction has an opcode and/or prefix byte indicative of a clear CRP information instruction (step 164). If the instruction does not have such an opcode/prefix byte, then the instruction may be executed in the usual manner (step 166). If, however, the instruction is determined to have an opcode or prefix byte indicative of a clear CRP information instruction, then the instruction (or information corresponding thereto) may be routed to the cache controller (step 168). In response thereto, the cache controller may be configured to clear and/or modify the stored CRP information as indicated by the instruction (step 170). For example, the clear CRP instruction may cause the cache controller to clear any stored CRP information corresponding to "class A" priority information. This shall be described in greater detail below.

Encoding of CRP Information

Figure 8:
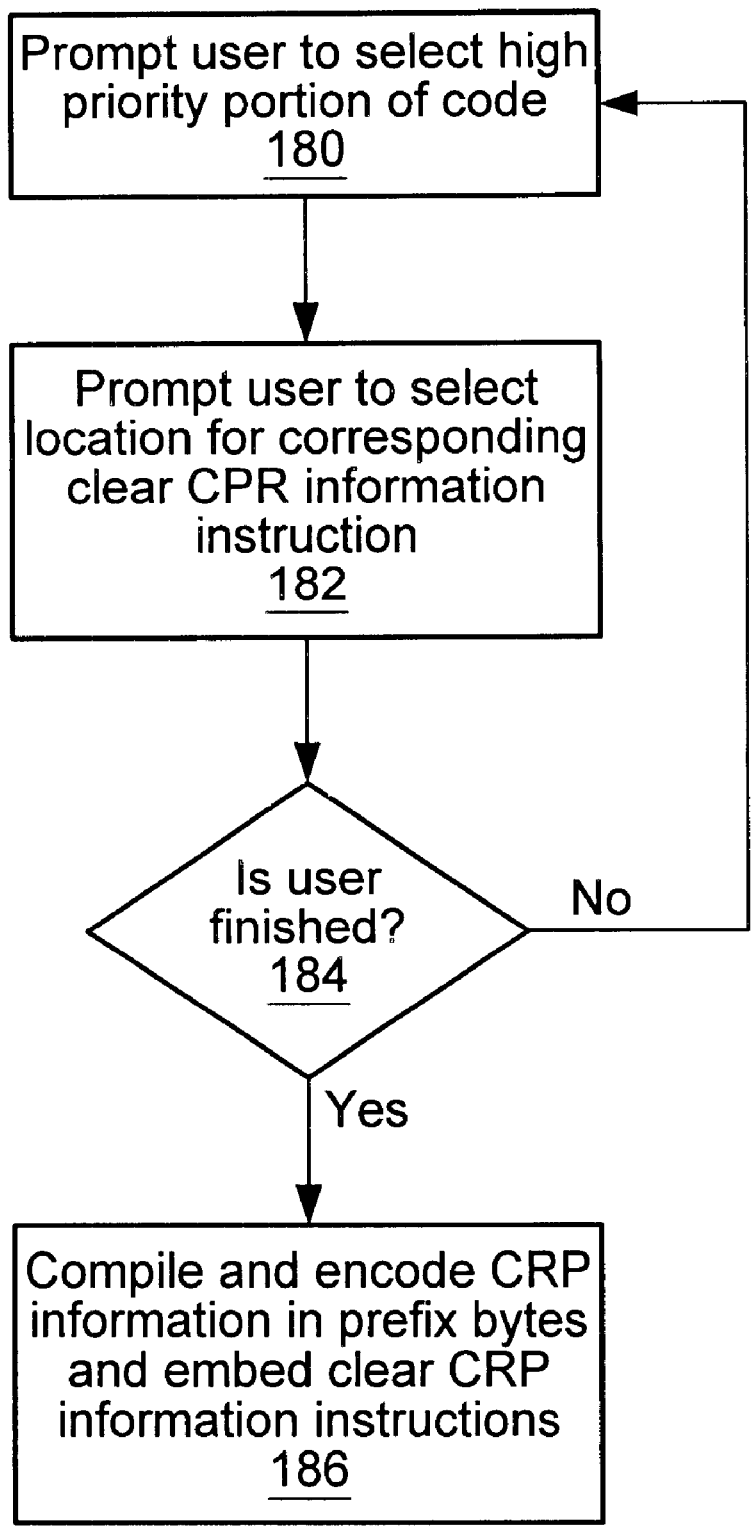
FIG. 8 is a flowchart illustrating one embodiment of a method for generating cache replacement priority (CRP) information.

Turning now to FIG. 8, one embodiment of a method for encoding CRP information is shown. In this embodiment, the user (e.g., the programmer or software engineer) is prompted to select high priority portions of code, e.g., object code or source code (step 180). Next, the user is prompted to select a location for one or more corresponding clear CRP information instructions (step 182). For example, a particular portion of code may be executed frequently while the program is in its initialization phase, but the portion of code may not be executed again once initialization is complete. Thus, the user would select a location after the initialization phase in the code to clear any CRP information related to that portion of the initialization code. The user may be prompted for multiple code portions and corresponding clear points (step 184). Finally, the code may compiled (or optimized) and CRP information may be embedded therein as prefix bytes, special opcodes, a file header, or a separate data file (step 186).

Alternate Embodiments

In some embodiments, a computer software program embodied on a computer-readable medium may be configured to execute object code repeatedly, and thereby automatically detect which portions of the object code should be classified as high priority. As previously noted, the CRP information may then be embedded within the object code as opcodes, prefix bytes, and/or as a separate data file associated with the object code. In embodiments that store the CRP information in a separate file, it may be advantageous for the operating system to cause the microprocessor to actively load the data file in connection with the object file. In some embodiments, the operating system may also provide information to the cache controller(s) related to context switches and the like (see below).

While the embodiments described herein have concentrated on encoding "high priority" CRP information, encoding other types of priority data is possible and contemplated. For example, some embodiments may have more elaborate schemes (e.g., CRP information indicating the corresponding instructions should be executed N times, wherein N is some predetermined integer greater than one). In these embodiments, in addition to clear CRP instructions or prefixes, decrement CRP instructions or prefixes may also be embedded within the object code. These instructions may cause the cache controller to "decrement" the priority of the stored instructions until they are no longer high priority instructions. This may be particularly useful when a programmer knows that a particular loop will be executed a predetermined number of times. After the instruction has been executed the predetermined number of times, the cache controller may cause the instruction to be overwritten in the cache because it has "outlived its usefulness" in the cache.

While the examples herein have focused on high priority instructions, similar methods may be used to allow encoding of low priority instructions. For example, the programmer may be provided an opportunity to specify certain instructions as having a low priority (e.g., they are likely to be only executed once). The cache control logic (also referred to herein as the cache controller) maybe configured to overwrite cache lines that contain these low priority instructions first before overwriting cache lines that do not contain these low priority instructions.

Special Considerations

One situation which may require special consideration is a context switch. Modem operating systems are configured to switch contexts periodically (e.g., when the user switched between two programs running concurrently). Context switches may be dealt with in a number of different ways. One solution is to flush all CRP data in the cache upon detecting a context switch. In other embodiments, a special buffer may be provided to store CRP information that may be overwritten as a result of a context switch. In yet other embodiments, the cache controller may be configured with a "watch dog timer" that is configured to invalidate or flush all CRP data a predetermined number of clock cycles after the CRP data was stored in the cache. In other words, in these embodiments the CRP data may be configured to have a maximum life of a predetermined number of clock cycles. Advantageously, the microprocessor may be configured such that standard cache invalidation/flushing instructions may continue to operate in the absence of any CRP information. In the event of a traditional cache flush, any CRP information stored in the cache may be flushed along with the other instructions or data in the cache.

Another situation that may require special consideration is a multiprocessor system. In some multiprocessor embodiments, each processor may be configured to signal the other processors when a clear CRP instruction is detected or executed. Advantageously, this may prevent the potential problem of a cache in one microprocessor filling up with high priority portions of code as the result of missing clear CRP instructions/prefixes that are executed by other microprocessors in the system.

Class Information

Figure 9:
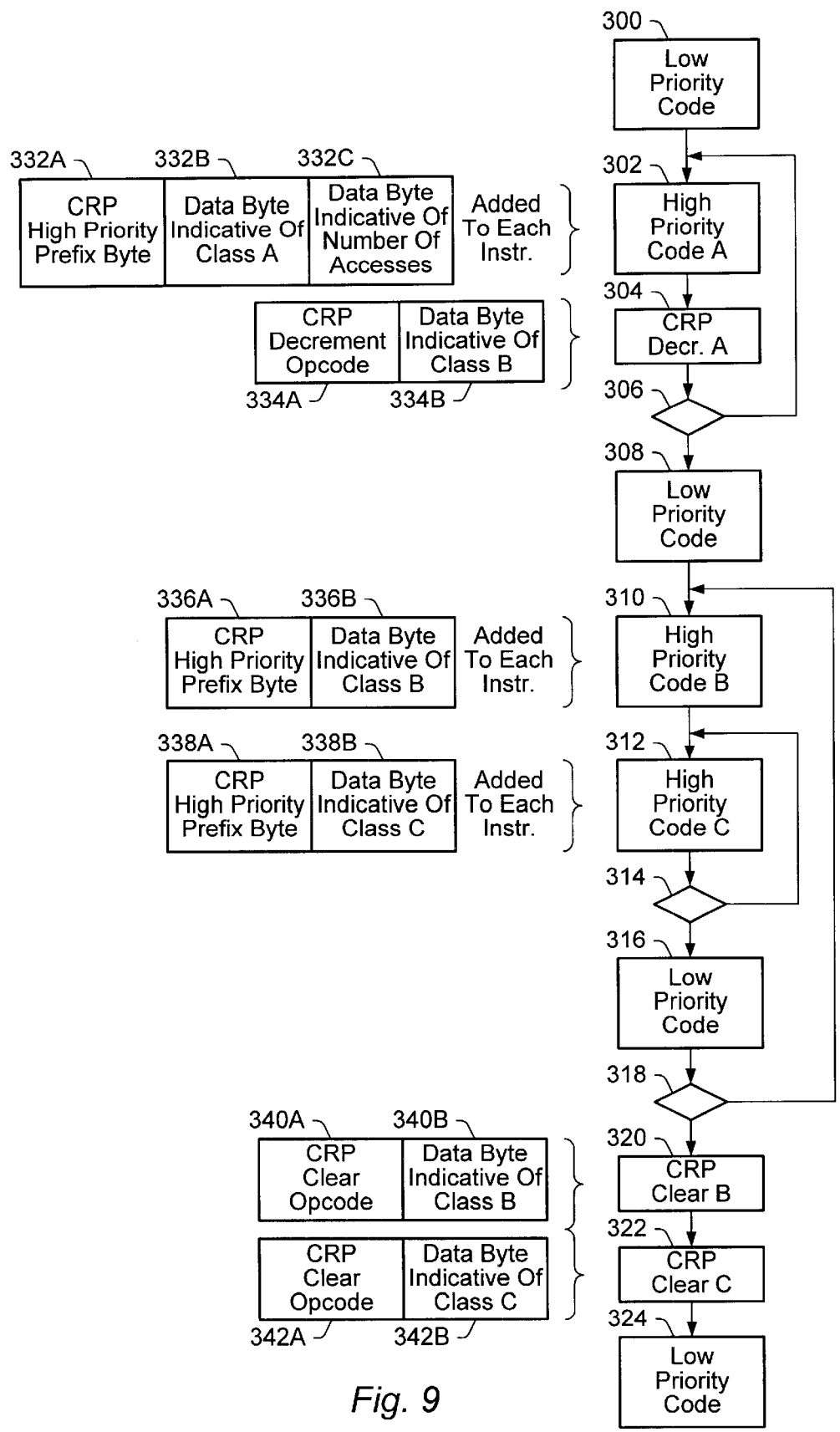
FIG. 9 is a diagram showing an alternate embodiment of a method for encoding cache replacement priority (CRP) information.

Turning now to FIG. 9, a flowchart illustrating one possible use of CRP information including "class" data is shown. Blocks 300–324 represent portions of object code. For example, blocks 300, 308, 316 and 324 are all low priority portions of code. Similarly, blocks 302, 310, and 312 are high priority portions of code. Blocks 306, 314, and 318 are conditional branch or jump instructions. As shown in the figure, code portion 302 is a high priority portion of code because it will be executed multiple times as the result of conditional branch instruction 306. As shown in the figure, the instructions comprising high priority code 302 are each prefixed by a number of bytes 332A–332C. Byte 332A indicates that the corresponding instruction is a high priority instruction with respect to cache replacement priority. Byte 332B indicates that the corresponding instruction is a "class A" instruction. As will be explained below, classes are used to differentiate different blocks of high priority code. Byte 332C is an optional byte indicative of the number of times the instruction will be executed before it is no longer a high priority instruction. In this particular embodiment, the CRP prefix bytes 332A–332C are added to each instruction within high priority code portion 302. A CRP decrement instruction 304 is then inserted following high priority code 302. The CRP decrement instruction 304 may comprise a single opcode byte 334 that may cause the cache controller to decrement the corresponding data bytes for high priority code 302 (i.e., the stored version of data byte 332C). The cache controller may be configured to store data byte 332C along with data byte 332B as the CRP information for the instructions in code portion 302. CRP decrement instruction 304 is configured to decrement the value of data byte 332C each time the instruction is executed. Once stored data byte 332C reaches zero, the cache controller may be configured to delete the CRP information for that instruction. In this way, a particular instruction may be classified as high priority for five accesses. After the fifth access, the instruction may be reclassified as a normal or low priority instruction.

FIG. 9 also illustrates another method for encoding CRP information and CRP clear instructions. Instructions in high priority code portions 310 and 312 may each be configured with prefix bytes 336A-338B that indicate (i) the corresponding instructions are high priority instructions, and (ii) which "class" of priority each instruction belongs to. As used herein, a "class" of priority is simply a means for identifying or grouping related instructions. For example, high priority code portion 310 is a class B priority code portion but it is not necessarily of higher priority than code portion 312 (i.e., a class C code portion). The class identifiers may instead be used to segregate different portions of code for priority clearance purposes. This allows instructions belonging to class B code portions to be cleared without effecting instructions going into class A or class C code portions. As shown in the figure, each instruction in code portions 310 and 312 may have a prefix byte 336A–338A, respectively. Either as an additional data byte, or as part of the CRP high priority prefix byte, each instruction may also have data indicative of which class the instructions belong to (i.e., see data bytes 336B and 338B). After branch instruction 318 is executed without branching, clear CRP information instructions 320 and 322 may be executed because the likelihood of executing code portions 310 and 312 drop dramatically. As shown in the figure, CRP clear instructions 320 and 322 comprise CRP clear opcodes 340A and 342A respectively, and data bytes 340B and 342B (indicative of which class of instruction is being cleared).

Note, while the examples above disclose the use of separate bytes for class information, in some embodiments one or more bits of the opcode may be used to indicate the class or category of the corresponding priority information. Furthermore, as used herein the term "prefix byte", while indicative of the most likely position of the CFR information, should be construed to refer generally to an optional bit, byte or bytes that is associated with an instruction (regardless of whether the bit, byte, or bytes are actually positioned before the instruction, within the instruction, or after the instruction). It is specifically contemplated that less than an entire byte might be used for CRP information in lieu of an entire byte. Similarly, each instruction in a program or high priority code portion need not have a prefix byte. Depending on the implementation it may suffice to add the CRP information sparingly in order to prevent undesirable code expansion.

Computer System

Figure 10:
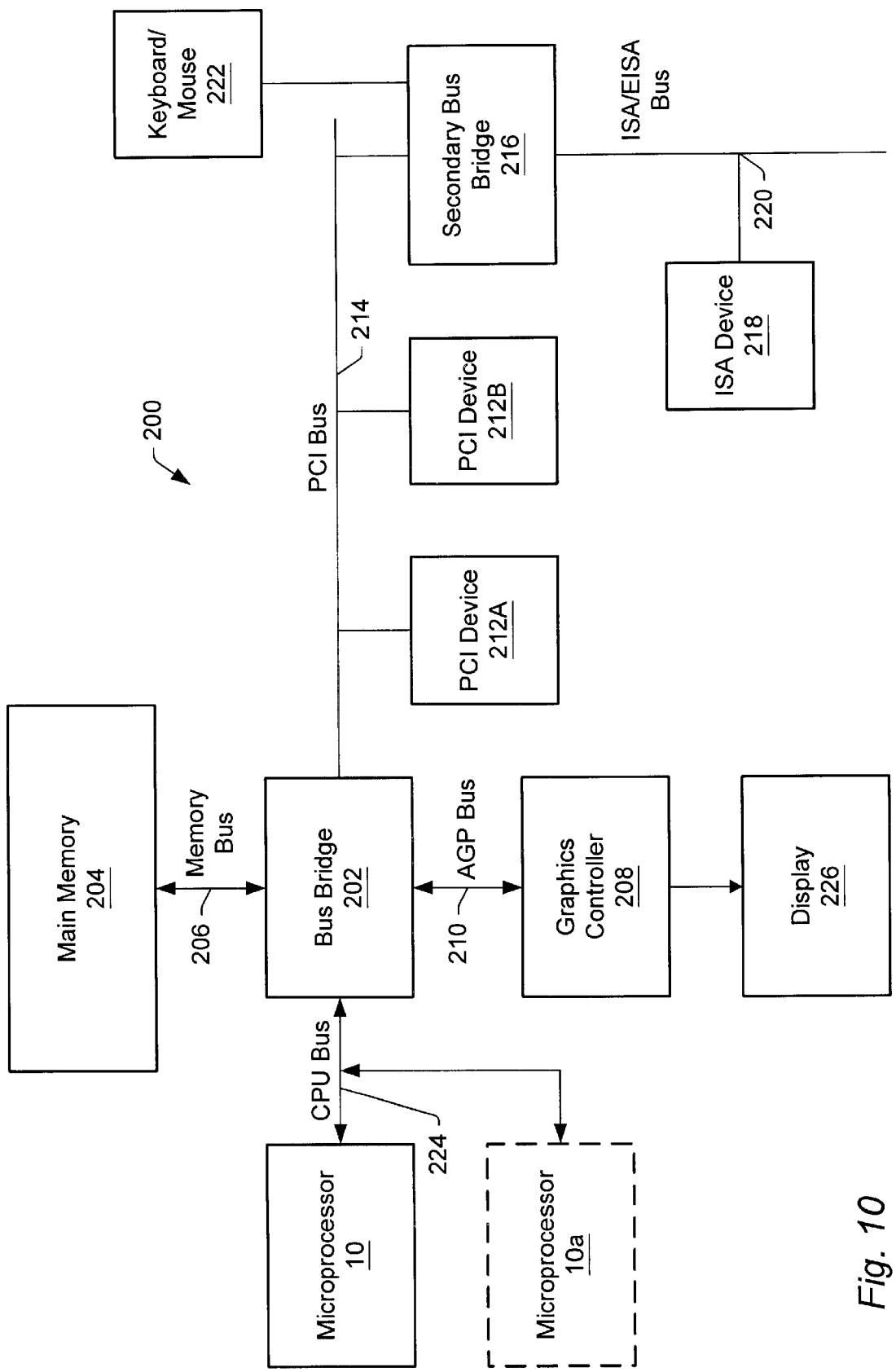
FIG. 10 is a diagram showing one embodiment of a computer system configured to utilize cache replacement priority (CRP) information.

Turning now to FIG. 10, a block diagram of one embodiment of a computer system 400 configured to using microprocessor 10 and instruction cache 16 is shown. In this embodiment, microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

Numerous variations and modifications will become apparent to those skilled in the art once the above disclosure is fully appreciated. It is intended that the following claims be interpreted to embrace all such variations and modifications.

What is claimed is:

1. A microprocessor comprising:
    a cache comprising a plurality of cache line storage locations and a corresponding plurality of replacement priority storage locations;
    a predecode unit, wherein the predecode unit is configured to receive and predecode instruction bytes, wherein the predecode unit is further configured to detect replacement priority information embedded within the instruction bytes and convey the replacement priority information with the predecoded instruction bytes to the cache for storage in the replacement priority storage locations and cache line storage locations, respectively; and
    a cache controller coupled to the cache and configured to use the contents of the replacement priority storage locations to determine which of the cache line storage locations to overwrite.

2. The microprocessor as recited in claim 1, wherein the predecode unit is configured to examine the prefix bytes of instructions for replacement priority information.

3. The microprocessor as recited in claim 1, wherein the predecode unit is configured to detect prefix bytes representing replacement priority information.

4. The microprocessor as recited in claim 1, wherein the predecode unit is configured to detect opcodes representing replacement priority information.

5. The microprocessor as recited in claim 1, wherein the cache controller is configured to store one replacement priority value per cache line.

6. The microprocessor as recited in claim 1, wherein the cache controller is configured to store one replacement priority value per N cache lines, wherein the cache is N-way set-associative, wherein N is a positive integer power of two.

7. The microprocessor as recited in claim 1, further comprising a plurality of decode units coupled to receive instruction bytes from the instruction cache, wherein the decode units are configured to decode and detect reset cache replacement priority (CRP) instructions, and wherein said decode units are configured to cause the replacement priority storage locations to be cleared in response to the reset CRP instructions.

8. The microprocessor as recited in claim 7, wherein the decode units are configured to cause a subset of the replacement priority storage locations to be cleared, wherein the subset of the replacement priority storage locations to be cleared have replacement priority tags that correspond to the reset CRP instruction detected by the decode units.

9. The microprocessor as recited in claim 1, wherein the predecode units are configured to detect reset replacement priority prefix bytes that indicate that the replacement priority storage locations should be cleared.

10. The microprocessor as recited in claim 9, wherein the decode units are configured to cause a subset of the replacement priority storage locations to be cleared, wherein the subset of the replacement priority storage locations to be cleared have replacement priority tags that correspond to the reset replacement priority prefix bytes.

11. A computer software program embodied on a computer-readable medium, wherein the computer software program comprises a plurality of instructions, wherein the plurality of instructions are configured to compile source code into object code, wherein compiling the source code comprises:
    translating source code instructions into object code instructions;
    determining which source code instructions are high priority for caching; and
    encoding cache priority information corresponding to the tags into the object code.

12. The computer software program as recited in claim 11, wherein the cache priority information is encoded into the object code as prefix bytes.

13. The computer software program as recited in claim 12, wherein the prefix bytes include a high priority prefix and a low priority prefix.

14. The computer software program as recited in claim 12, wherein the prefix bytes include a high priority prefix, a low priority prefix, and a clear priority prefix.

15. The computer software program as recited in claim 12, wherein the prefix bytes include a plurality of different priority prefixes.

16. The computer software program as recited in claim 15, wherein the prefix bytes include a plurality of reset prefixes, wherein each reset prefix corresponds to one or more of the different priority prefixes.

17. The computer software program as recited in claim 11, wherein the cache priority information is encoded into the object code as one or more predetermined opcodes.

18. The computer software program as recited in claim 17, wherein the one or more predetermined opcodes include a start high priority instruction, an end high priority instruction, and a clear priority instruction.

19. The computer software program as recited in claim 11, wherein the prefix bytes include a high priority prefix and a low priority prefix.

20. The computer software program as recited in claim 11, wherein the software is configured to generate clear priority instructions.

21. The computer software program as recited in claim 11, wherein the software is configured to generate reduce priority instructions.

22. The computer software program as recited in claim 11, wherein the software is configured to prompt the user to identify which portions of the source code have a high priority with respect to cache retention and replacement, and wherein the software is configured to prompt the user to identify a point in the source code after which the corresponding high priority source code portion may be removed from the cache.

23. A computer software program embodied on a computer-readable medium, wherein the computer software program comprises a plurality of instructions, wherein the plurality of instructions are configured to:

monitor the execution of an object code application, determine which portions of the object code are executed more frequently than the object code in general; and encode cache priority information for at least the more frequently executed portions.

24. The computer software program as recited in claim 23, wherein the cache priority information is encoded as a separate data file associated with the program.

25. The computer software program as recited in claim 23, wherein the cache priority information is encoded using prefix bytes embedded in the object code.

26. The computer software program as recited in claim 23, wherein the cache priority information is encoded using prefix bytes embedded as special opcodes in the object code.

27. The computer software program as recited in claim 26, wherein the special opcodes include a start high priority opcode, an end high priority opcode, and a clear priority opcode.

* * * * *